J. HANSON AND M. L. BRAMSON.
STOP VALVE FOR FLUID PRESSURE SYSTEMS.
APPLICATION FILED MAY 18, 1920.
1,360,993.
Patented Nov. 30, 1920.
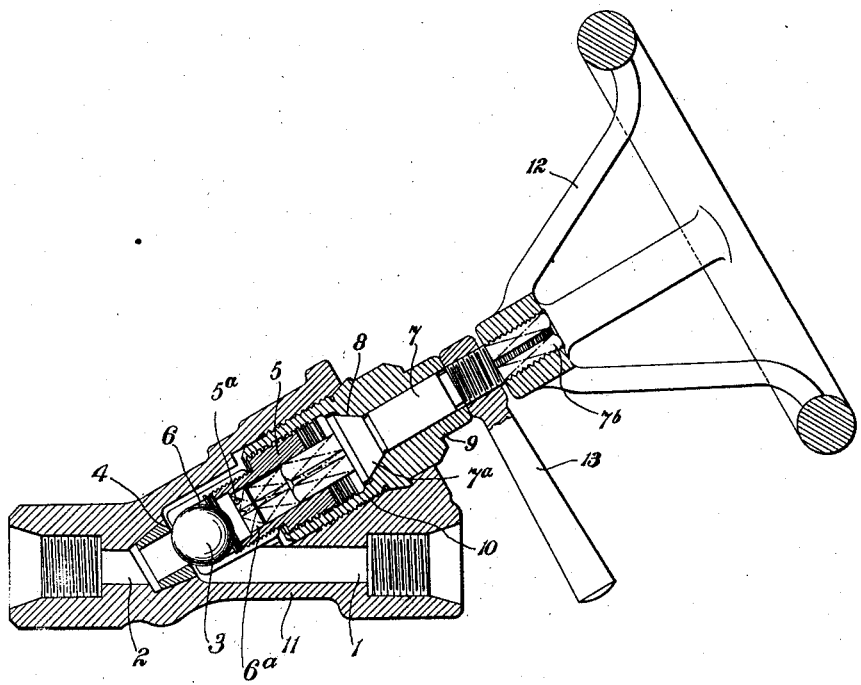

UNITED STATES PATENT OFFICE.

JAMES HANSON AND MOGENS LOUIS BRAMSON, OF STAFFORD, ENGLAND.

STOP-VALVE FOR FLUID-PRESSURE SYSTEMS.

1,360,993. Specification of Letters Patent. Patented Nov. 30, 1920.

Application filed May 18, 1920. Serial No. 382,393.

*To all whom it may concern:*

Be it known that we, JAMES HANSON and MOGENS LOUIS BRAMSON, subjects of the Kings of Great Britain and Denmark, respectively and residents of Stafford, in the county of Stafford, England, have invented certain new and useful Improvements in and Connected with Stop-Valves for Fluid-Pressure Systems, of which the following is a specification.

This invention relates to stop valves for fluid pressure systems and has reference to screw down valves adapted to be operated by a rotatable but axially immovable packing member provided with a conical member and adapted to be locked with the conical member in leak tight engagement with its seating when the valve has been adjusted.

The present invention consists of a particular construction of such valves specially designed to enable a removable and replaceable ball valve to be employed, the ball being carried in a removable cage so that in the event of wear the ball valve can be readily removed and a fresh one substituted.

A valve according to our invention therefore consists essentially of a casing having inlet and outlet passages, a valve seating separating said passages, a screw threaded valve carrying member coöperating with a screw thread in a fixed casing member, a removable open ended cage carrying a ball valve in coöperative relation with the valve seating, said cage being rigidly but removably connected to the valve carrying member, a rotatable but axially immovable operating spindle having a conical leak preventing packing member and a projection on said spindle making engagement with the valve carrying member whereby said valve carrying member and its valve can be rotated and adjusted by said operating spindle.

In the accompanying drawings we have illustrated in sectional elevation a valve constructed and operating in accordance with our invention.

Referring to these drawings the numeral 1 designates the inlet passage from the pressure apparatus or supply and the numeral 2 designates the outlet passage to the mechanism to be actuated.

These inlet and outlet openings may however be reversed, but there is an advantage in making the inlet opening 1 behind the valve, as by this means the pressure in the system assists to keep the valve closed.

Interposed between these inlet and outlet openings we provide the ball valve 3, adapted to be adjusted to and from its seating 4, by means of the screw threaded valve carrying member 5, with which the ball is connected by the cage or carrier 6, connected to and movable with it, a thrust button $6^a$ locked to the member 5 by a pin $5^a$ holding the ball 3 in position. The screw threaded member 5 is engaged at its inner end by the squared shank of the rotatable packing member 7 which is provided with a cone packing $7^a$, which when the valve is adjusted is engaged tightly with the seating 8 of the casing member 9 which is rigidly connected as by the screw threads 10 with the main casing 11. The outer squared extremity $7^b$ of the packing member 7 is rigidly connected to an operating wheel or handle 12 and is positioned so as to cause the packing cone $7^a$ to make a tight joint on its seating and be locked in this position by means of the locking nut or handle 13.

This locking nut or handle is not always necessary but it is desirable to provide it particularly where the valve is likely to be subjected to vibration.

The operation of the device is as follows:—The locking nut or handle 13 is slackened and the rotatable member 7 is rotated but does not move longitudinally, the packing cone $7^a$ rotating on its seat 8. By reason of its rotation, however, it imparts rotary motion to the member 5 which as aforesaid carries the ball valve 3 in the cage 6. By reason of the screw threaded engagement of the member 5 with the fixed casing 9, the member 5 moves longitudinally and carries the ball valve into and out of engagement with its seat as may be desired and the valve is then again locked in the adjusted position by the locking nut or handle 13. It will be found that a valve constructed as aforesaid will remain in its adjusted position in spite of vibration and moreover the pressure liquid is prevented from leaking back by the cone member $7^a$ which always remains upon its seat.

What we claim and desire to secure by Letters Patent is:

A stop valve for fluid pressure systems, comprising a casing having a passage provided with inlet and outlet openings and also having a bore at an angle to and intersecting said passage, a valve seat detachably fitted in the bore and passage at the point of their intersection; a member threaded in the outer portion of said bore, a ball valve to close on said seat, a cage for the ball valve, a carrier to which said cage is threadedly connected, said carrier being threaded in said member, and a stem mounted for rotation in said member and against longitudinal movement, said stem being connected to said carrier to rotate the latter and produce longitudinal movement thereof.

Signed at London, England.

JAMES HANSON.
MOGENS LOUIS BRAMSON.